UNITED STATES PATENT OFFICE.

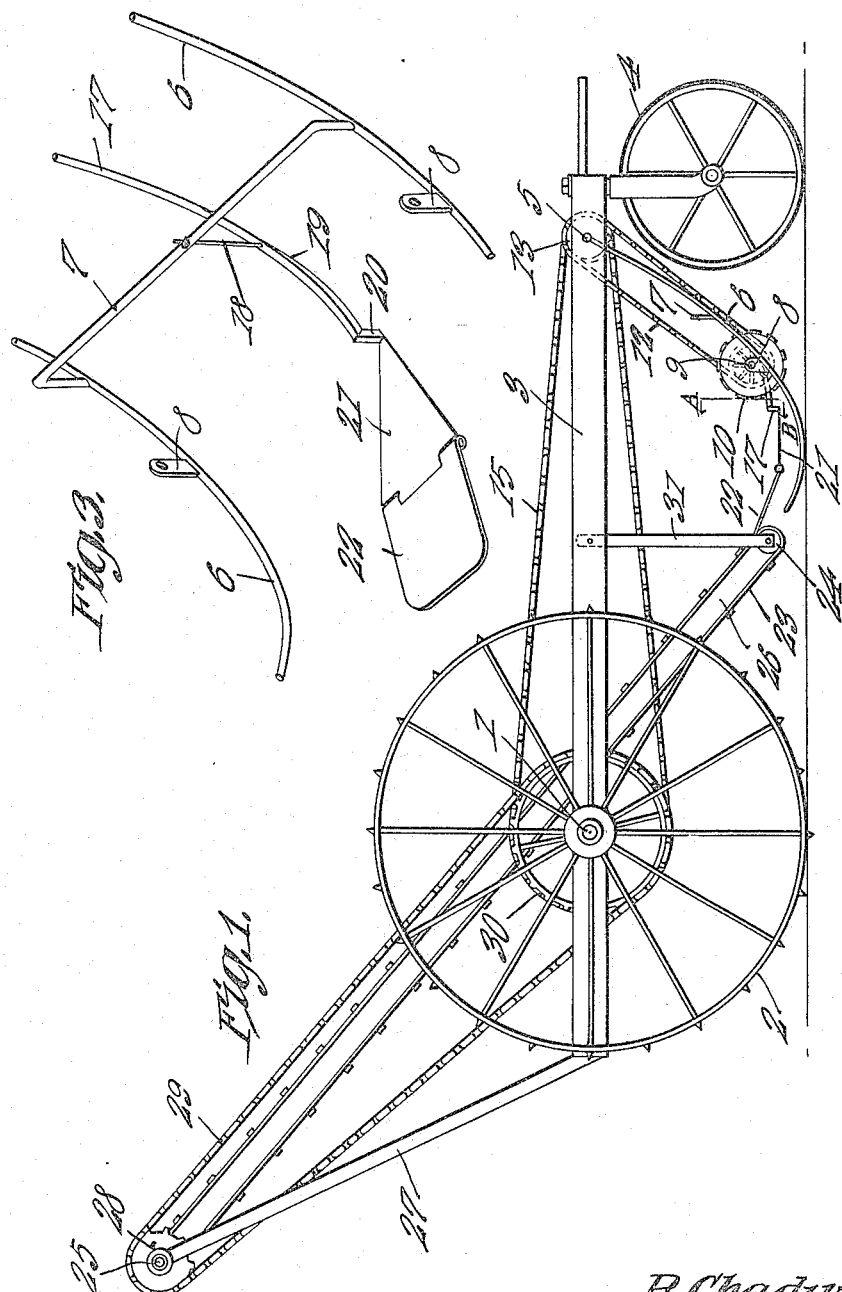

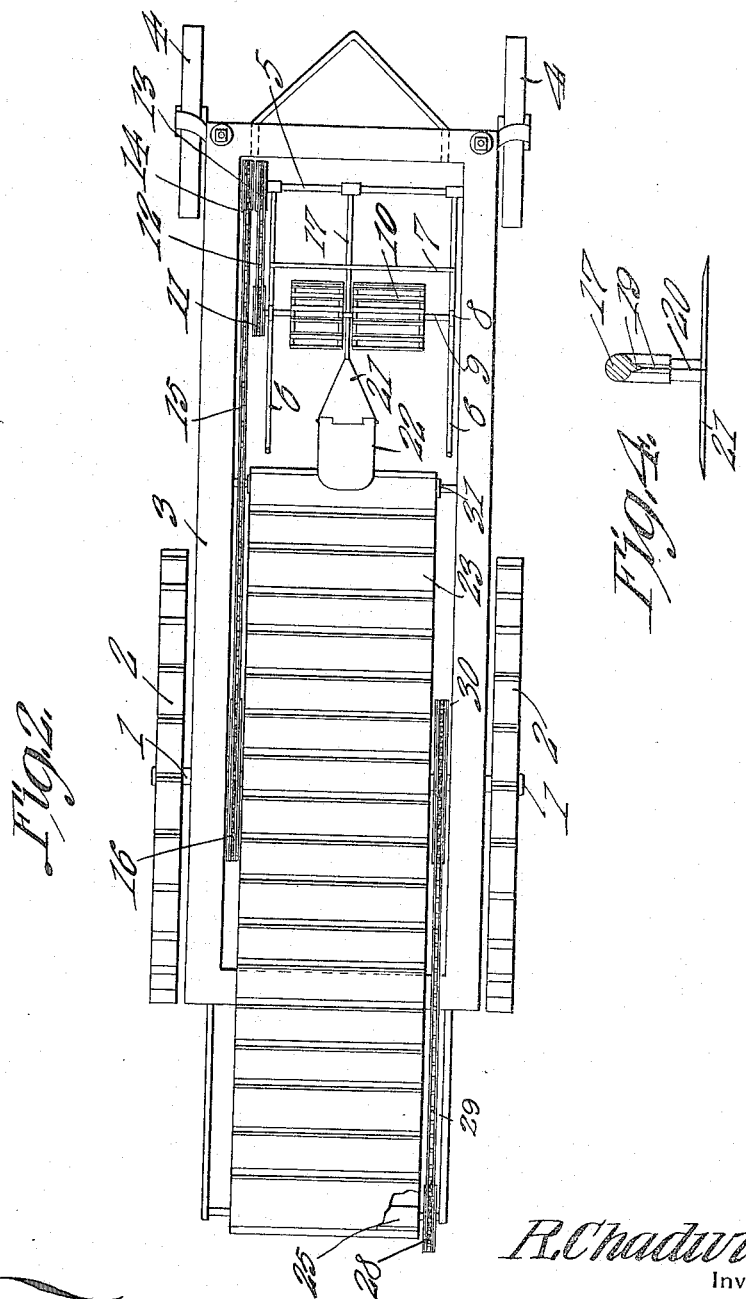

ROBERT CHADWICK, OF LEXINGTON, NEBRASKA.

MACHINE FOR TOPPING BEETS.

1,194,359.  Specification of Letters Patent.  Patented Aug. 15, 1916.

Application filed November 20, 1915. Serial No. 62,575.

*To all whom it may concern:*

Be it known that I, ROBERT CHADWICK, a citizen of the United States, residing at Lexington, in the county of Dawson and State of Nebraska, have invented a new and useful Machine for Topping Beets, of which the following is a specification.

This invention relates to machines for topping beets, one of the objects being to provide a machine designed to straddle rows of beets and having means whereby during the forward movement of the machine, the crown portion of each beet in a row will be split diametrically and then severed from the body of the beet, the severed crown portion together with the top, being directed onto an elevator which operates to discharge them onto the ground or into a receiver provided therefor.

A further object is to provide a novel form of gage whereby the thickness of the slice removed from the top of the beet can be made comparatively uniform.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a side elevation of the machine. Fig. 2 is a plan view thereof. Fig. 3 is a perspective view of the cutting blade and its gage. Fig. 4 is an enlarged section on line A—B Fig. 1.

Referring to the figures by characters of reference 1 designates an axle supported by wheels 2 and this axle supports one end portion of a frame 3 the other end portion of which is supported by the wheels 4. A shaft 5 is arranged transversely within the front end portion of the frame and mounted to swing thereon are downwardly and rearwardly curved runners 6 connected at intermediate points by an upstanding yoke 7. These runners are provided with upstanding bearings 8 in which is journaled a shaft 9 carrying a reel 10. This shaft has a sprocket 11 at one end which receives motion through a chain 12 from a sprocket 13 secured to the shaft 5. Another sprocket 14 is secured to said shaft and receives motion, through a chain 15, from a sprocket 16 secured to and rotating with the axle 1 within but close to one side of the frame 3. Reel 10 is preferably formed of two spaced sections and extending between these sections is a downwardly and rearwardly curved arm 17 mounted to swing upon the shaft 5 and adjustably connected to the yoke 7 by a bolt 18. The rear portion of the arm 17 has a knife 19 extending longitudinally thereunder and located at the rear extremity of this knife is a depending knife 20 provided at the front end or apex of a horizontal shearing blade 21 triangular in contour. Hingedly connected to the rear end of this blade 21 is an apron 22. The rear end of this apron rests loosely upon the lower end portion of an endless elevator 23 supported by a front roller 24 and a rear roller 25. The front roller is journaled between the lower ends of upwardly and rearwardly inclined side strips 26 while the rear roller is journaled between the upper ends of said side strips. Braces 27 connect the upper ends of the side strips to the rear portion of frame 3. A sprocket 28 rotates with the upper roller 25 and receives motion, through a chain 29, from a sprocket 30 secured to the revoluble axle 1 close to one side of but within the frame 3. Supporting arms 31 are preferably provided for connecting the lower or front end portions of the side strips 26 to the sides of the frame 3.

It is to be understood that the blades 20 and 21 are rigid and are fixed relative to each other and to the blade 19. By means of the bolt 18 the arm 17 can be adjusted upwardly or downwardly, thus to raise or lower the blades relative to the runners 6. When the said runners 6 are resting on the ground, the blades 19, 20 and 21 are designed to be so positioned as to successively cut through the tops, split the crown portion of a beet and then sever the split crown portion. As the machine is moved forwardly the reel 10 will lift the tops so that the blades will cut through them and they will be entirely elevated above the horizontal blade 21. The tops, after being severed, will be pushed onto the upper flight of the conveyer 23 and carried upwardly and discharged onto the ground or into a suitable receiver provided therefor.

It is to be understood that the machine is to be so proportioned that when it is desired to remove the tops from one row of beets, the entire machine will straddle three rows and when it is desired to remove the tops from two rows of beets, the entire machine will straddle four rows. Thus ample room is given for the operation of the mechanism without interference and without undesirable congestion.

While the blade 21 has been shown and described as arranged with its cutting edges forward, it is to be understood that if desired the blade can be made V-shaped and reversed with its point or apex at the rear, the edges of the blade or knife operating to gather the tops toward the center of the said knife during the cutting operation.

What is claimed is:—

1. A machine for topping beets, including an endless conveyer, runners mounted for up and down swinging movement and in advance of the conveyer, a connection between the runners, a knife adjustably secured to said connection and shiftable upwardly and downwardly relative to the runners, and means connected to said knife for splitting the crown portion of the beet and for severing said crown portion respectively, and means for directing the severed portions of the beets from said severing means onto the conveyer.

2. A machine for topping beets, including an elevator, runners mounted for up and down swinging movement, a connection between the runners, an arm between the runners, means depending from the connection and engaging the arm for adjusting said arm upwardly and downwardly relative to the runners, separate knives connected to the arm for successively dividing the tops, splitting the crowns and severing the split crowns of the beets, and means for directing the severed portions of the beets onto the elevator.

3. A machine for topping beets, including an elevator, runners mounted for up and down swinging movement, a connection between the runners, an arm between the runners, means depending from the connection and engaging the arm for adjusting said arm upwardly and downwardly relative to the runners, separate knives connected to the arm for successively dividing the tops, splitting the crowns and severing the split crowns of the beets, and means for directing the severed portions of the beets onto the elevator, said means being hingedly mounted and bearing upon the elevator.

4. In a machine for topping beets, a movable frame, an elevator supported thereby, a transverse shaft, runners pivotally mounted thereon and extending downwardly and rearwardly therefrom and normally engaging the ground, an arm interposed between the runners and pivotally mounted on the shaft, a connection between the runners, means extending from said connection and engaging said arm for adjusting said arm upwardly and downwardly relative to the runners, a reel supported by the runners, means for transmitting motion from said shaft to the reel, means carried by the arm and back of the reel for severing the tops of the beets, splitting the crown portion of the beet and removing said crown portion, and means for directing said severed portion of the beet onto the elevator.

5. In a machine for topping beets, a movable frame, an elevator supported thereby, a transverse shaft, runners pivotally mounted thereon and extending downwardly and rearwardly therefrom and normally engaging the ground, an arm interposed between the runners and pivotally mounted on the shaft, a connection between the runners, means extending from said connection and engaging said arm for adjusting said arm upwardly and downwardly relative to the runners, a reel supported by the runners, means for transmitting motion from said shaft to the reel, a longitudinal cutting blade carried by the arm, a substantially vertical cutting blade carried thereby, a substantially horizontal severing blade extending rearwardly from the vertical blade, and an apron hingedly connected to said severing blade and bearing upon the elevator, said blades being rigid and fixed relative to each other and to the arm.

In testimony that I claim the foregoing as my own, I have hereto affixed my signature in the presence of two witnesses.

ROBERT CHADWICK.

Witnesses:
W. A. CRANDALL,
C. J. WELDUS.